(12) United States Patent
Delatorre

(10) Patent No.: US 8,181,537 B2
(45) Date of Patent: May 22, 2012

(54) LINEARIZED TORQUE FLOW SENSOR

(76) Inventor: Leroy C. Delatorre, Sugar Land, TX (US)

( * ) Notice: Subject to any disclaimer, the term of this patent is extended or adjusted under 35 U.S.C. 154(b) by 134 days.

(21) Appl. No.: 12/807,182

(22) Filed: Aug. 30, 2010

(65) Prior Publication Data

US 2011/0162446 A1 Jul. 7, 2011

Related U.S. Application Data

(60) Provisional application No. 61/275,468, filed on Aug. 31, 2009.

(51) Int. Cl.
*G01F 1/74* (2006.01)
(52) U.S. Cl. ..................................... 73/861.74
(58) Field of Classification Search ............... 73/861.74, 73/861.69, 861.353, 861.79
See application file for complete search history.

(56) References Cited

U.S. PATENT DOCUMENTS

| | | | | |
|---|---|---|---|---|
| 2,706,406 | A | * | 4/1955 | Vincent et al. ............. 73/152.31 |
| 2,975,635 | A | * | 3/1961 | Kindler et al. ............. 73/861.02 |
| 3,241,367 | A | * | 3/1966 | Moss et al. ................. 73/861.03 |
| 5,463,903 | A | | 11/1995 | Delatorre |
| 6,601,461 | B2 | * | 8/2003 | Maxit et al. ................ 73/861.79 |

FOREIGN PATENT DOCUMENTS

WO  WO 97/21077  6/1997

* cited by examiner

*Primary Examiner* — Jewel V Thompson
(74) *Attorney, Agent, or Firm* — W. Allen Marcontell

(57) ABSTRACT

A fluid flow meter is responsive to measured torque force imposed by fluid flow over a static impeller. Exponential torque relationships imposed upon a static torque shaft by fluid flow over a static impeller are linearized by a resilient torque shaft restraint and translated to flow rate values by torque measuring means.

16 Claims, 5 Drawing Sheets

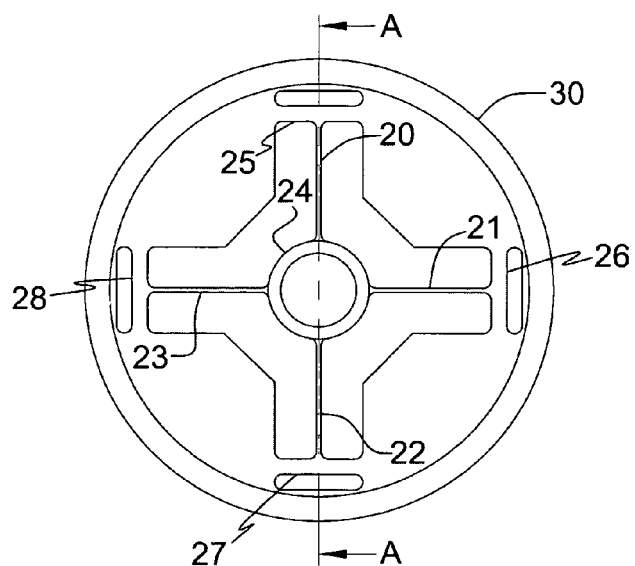
FIG. 4a
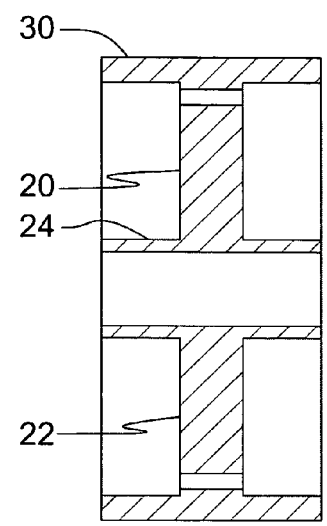
SECTION A-A
FIG. 4b
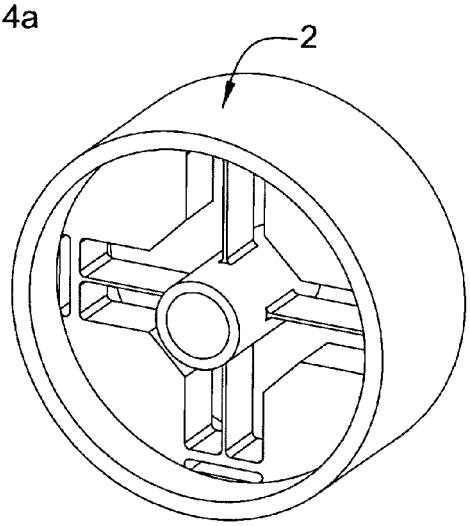
FIG. 4c
FIG. 4

LINEARIZED TORQUE FLOW SENSOR

CROSS-REFERENCE TO RELATED APPLICATION

The priority date benefit of Provisional Application No. 61/275,468 titled Linearized Torque Flow Sensor filed Aug. 31, 2009 is claimed for this application.

BACKGROUND OF THE INVENTION

1. Field of the Invention

This invention relates to fluid flow meters and more particularly to flow meters for measuring flow within an oil or gas well environment. Specifically, this environment will generally include exposure to high temperatures, high pressures, corrosive media, shock and vibration. Additional requirements are also a small diametrical size, low power consumption and the ability to make measurements while in motion.

2. Description of Related Art

Fluid flow within an oil or gas well has long been a very important parameter for well troubleshooting and evaluations. The most suitable instrument for this measurement has traditionally been based on a rotating turbine type of flow meter. The rotating impeller does give a good measure of the fluid velocity but it also has limitations imposed by friction and the required application of precision bearings within a hostile, contaminated fluid environment.

The effect of unavoidable friction in the impeller bearings is to limit the lowest measurable flow to that which is necessary to overcome the bearing friction losses. These friction losses can be reduced by making the bearings, and impeller, more sensitive but then this can also make the flow meter more susceptible to the effects of contamination and/or wear.

U.S. Pat. No. 5,463,903 discloses a fluid flow sensor having no moving parts. An impeller element of the assembly is substantially static. Fluid flow over the static impeller imposes a static torque stress upon a non-rotating shaft. This torsional stress is transferred to a variable capacitor, the values of which are calibrated to fluid flow rate values. Although this '503 flow meter has no moving parts and no minimum flow threshold, there is, in actual practice, a lower limit of flow measurement as a result of the exponential relationship between torque and flow:

$$\text{Torque} = K \cdot \rho \cdot V^2$$

Where K is a proportionality constant, $\rho$ is the fluid density and V is the flow velocity. Flow rate, of course, is directly proportional to flow velocity so it becomes necessary to take the square root of torque to obtain a linear flow relationship. This square root relationship, however, has the effect of limiting the useable dynamic flow measurement range. For example, if the proportionality constant, K, is chosen so that 100% of full scale (FS) flow is equal to 100% FS of the torque sensor, then 1% FS flow would be equal to 0.01% of the torque sensor full scale. Since errors related to the torque sensor and its environment can easily exceed this value, then a measurement of 1% FS flow would be extremely inaccurate. It is also apparent that any small shift in the zero reading of the overall sensor could easily appear as a flow when none was present.

It is an object of this invention, then, to provide a torque flow sensor suitable for making accurate flow measurements over a wider range of flows, within the conditions encountered in oil or gas wells.

SUMMARY OF THE INVENTION

The present invention is embodied in a torque flow sensor which does not have a rotating flow impeller and which also responds to flow velocity with a more linear relationship to torque. The conversion, from a square root relationship to a more linear relationship, is performed by a resilient, mechanical, stress restraint on the input torque shaft. Additionally, this restraint provides an accurate mechanical zero reference to enhance measurement from low to full scale flow values. Another benefit of this restraint is that it operates over displacements which are suitable for adding a mechanical limiter to limit the maximum torque applied from an impeller under flow over range conditions.

A second embodiment utilizes a field interchangeable flow restrictor to allow a single flow meter, and impeller, to be utilized for a wide range of different flow conditions, such as measurements in different size flow lines.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

FIG. 4A is an end view of the linearizer element.

FIG. 4B is a sectional view of the linearizer element taken along cut line A-A of FIG. 4A.

FIG. 4C is a pictorial view of the linearizer element.

DESCRIPTION OF THE PREFERRED EMBODIMENTS

Figure 1:
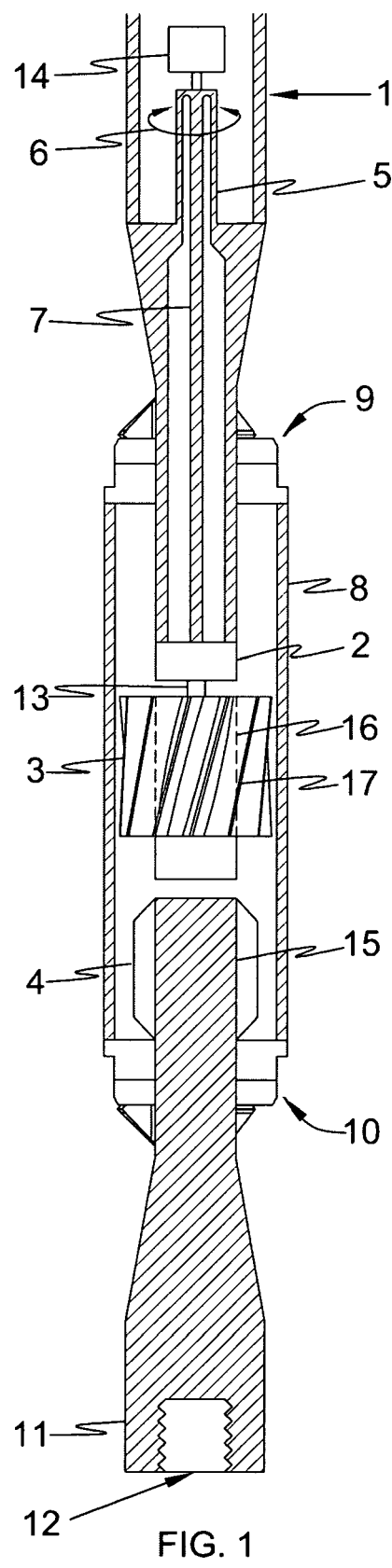
FIG. 1 is a view, in longitudinal cross-section, of an embodiment of the flow meter of the present invention.

FIG. 1 illustrates a preferred embodiment for this invention. This arrangement comprises a longitudinal pressure housing, 1, which is coupled to an impeller housing, 8, and an end coupling, 11. End coupling, 11, has a box thread, 12, which is provided to couple onto additional modules or weight elements (not shown) below it. Weight bars are used to provide a downward force to facilitate lowering a tool string into a well.

Flow enters (or exits) into the impeller housing through openings, 9, and exits (enters) through 10. As the fluid passes through the impeller housing, 8, it impinges upon the multiple vanes 17 of static impeller 3. As the fluid flow direction is turned over the vanes 17 surfaces, reaction forces induced by fluid momentum over the vane 17 surfaces result in a torsional force exerted by impeller, 3, onto restraint/linearizer, 2, by means of shaft, 7a. The output torque of linearizer, 2, is then transmitted by shaft, 7b, to a pressure isolator torque tube, 5, which couples the torque into the pressure housing, 1, for conversion into an electrical signal by a suitable torque sensor, 14.

One example of a torque sensor suitable for the present application is disclosed in U.S. Pat. No. 5,463,903 which relies upon a variable value capacitor. Another such example using strain gauge principles is disclosed in U.S. application Ser. No. 12/802,014. The disclosures of both examples are hereby incorporated herewith in support of the present disclosure.

Also shown in FIG. 1 is a flow restrictor, 4, which may optionally be installed in the flow path to extend the sensor operation for flows which would normally be beyond its range. This restrictor is in the form of a sleeve which can easily have its diameter sized according to application requirements. Its purpose, then, is to allow easy field interchangeability of the flow range without having to change the impeller or torque sensor.

Figure 2:
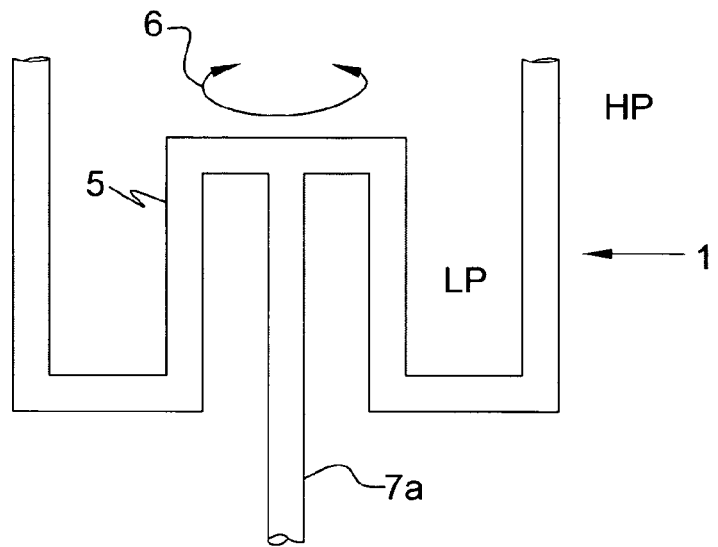
FIG. 2 is an illustration of a pressure isolator torque tube.

FIG. 2, illustrates the operation of the pressure isolator torque tube, 5, which is also shown in FIG. 1. The reference numbers are the same as those used in FIG. 1.

The object of the pressure isolator torque tube is to provide frictionless torque coupling from one area of fluid pressure into another. In this case a high pressure fluid generally will exist external to the pressure vessel, 1, while an atmospheric condition will exist within it. If packings were to be employed around shaft, 7a, to isolate these pressure media, then friction and pressure effects would be introduced. The torque tube, 5, however, accomplishes this function without the introduction of either effect. The effect of a pressure difference across it is simply to change linear dimensions but this will have no, or little, effect on the transmitted torque, provided the torsional angular displacements are kept small. Temperature effects are rejected in the same manner.

Figure 3:
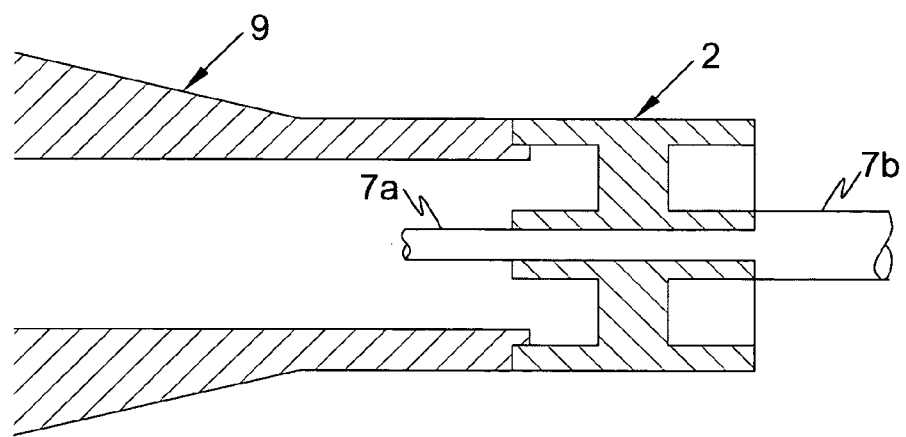
FIG. 3 illustrates the basic application of the support-linearizer.

FIG. 3 illustrates a representative assembly relationship between the resisient linearizer and the torque shaft 7. In this example, a materially integral shaft 7 comprises an input segment 7b and output segment 7a. The input segment is torsionally stressed by the static impeller 3. The shaft 7 is rigidly and non-rotatively secured to the central hub 24 of the linearizer as by welding. The outer frame 30 of the linearizer is non-rotatively secured to the impeller housing 8. The output segment 7a of the shaft 7 is rigidly secured to the pressure isolator tube 5.

Another design of the relationship between the linearizer 2 and the torque shaft 7 may provide the shaft increments 7a and 7b as separate and independent elements. However, both elements 7a and 7b are rigidly secured (as by welding) to the linearizer hub 24. In either case, the linearizer 2 is positioned intermediate of the torque axis 7a and 7b ends, between the impeller 3 and torque sensor 14.

The basic linearizer element, 2, is depicted in FIGS. 4A-C. As shown in the end view, FIG. 4A, it comprises four thin beams, 20, 21, 22 and 23, which are interposed between a central hub, 24, and outer support beams, 25, 26, 27 and 28 at 90 degree intervals. Now, referring to the sectional view, FIG. 4B, it can be seen that the thin beam elements, 20 to 23, have the same depth as the end support beams, 25 to 28. The whole structure is then enclosed and constrained by outer frame 30. FIG. 4C is a pictorial view of the complete linearizer element, 2. Also, the number of beams could be different from four but four are used for this illustration.

Figure 5A:
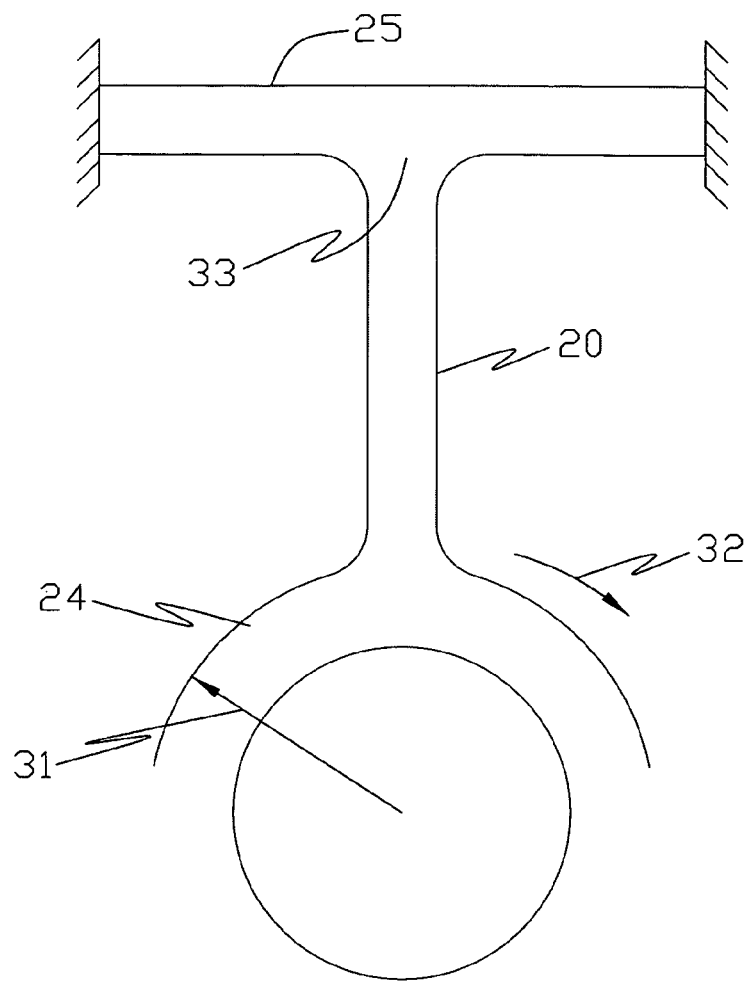
FIG. 5A illustrates a beam fixed on both ends.
Figure 5B:
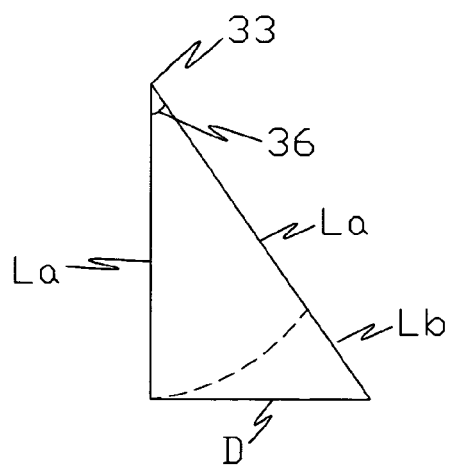
FIG. 5B illustrates the beam of FIG. 5A which has been displaced.

FIG. 5A shows the beam, 20, of FIG. 4A. This beam resiliently responds exponentially to the effects of a rotation, 32, of the central hub, 24. Its support beam, 25, is also shown with both of its ends effectively anchored, for the purpose of illustration. FIG. 5B denotes happens when beam 20 is deflected by the rotation, 32, of FIG. 5B. If the displacement, D, is small with respect to the circumference of the central hub/shaft, 24, then the element lengths of FIG. 5B will tend to form a right triangle. The initial un-deflected position of beam, 20, of FIG. 5A is shown as La and then it is rotated to a deflected position which is depicted as La+Lb. The La portion of the deflected hypotenuse is simply the same length of, La, which has been rotated about point 33, as shown in FIGS. 5A and 5B. Lb, then, represents the change in length required of beam 20 for the deflection, D. Now, since distances D, La, and Lb form a right triangle then, by the Pythagorean theorem:

$$Lb+La=(D^2+La^2)^{0.5} \tag{1}$$

So that the required change in the length of beam, 20, becomes:

$$Lb=(D^2+La^2)^{0.5}-La \tag{2}$$

Figure 5C:
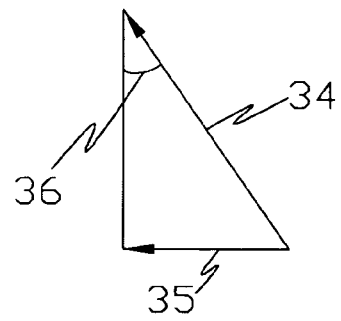
FIG. 5C is a vector diagram of forces acting upon the linearizer beam of FIG. 5A.

If, however, beam, 20, is simply allowed to move down from point 33, then Lb would represent the required deflection of support beam, 25, of FIG. 5A. Also, if the deflection constant of support beam, 25, is K then the support beam would apply a force of $$F=K \cdot Lb \tag{3}$$

to the end of beam, 20. This force is illustrated by the vector diagram of FIG. 5C as a force vector 34. This, then will result in a force, 35, along the circumference of the hub and, therefore also result in a torque, T, opposing the rotation. This force, 35, is given by:

$$F(T)=K \cdot Lb \cdot \sin\phi \tag{4}$$

Where $\phi$ is the angle 36 in FIGS. 5B and 5C, and this is directly proportional to the rotation angle of the central hub/shaft. It is important to note that $\sin\phi$ is also very nearly equal to $\phi$, for small angles, when $\phi$ is in radians. This equation, then, says that the resisting torque force, due to a force from the support beam, (K·Lb), is directly proportional to the rotation angle of the hub/shaft and Lb.

Now, for small angles:

$$D=La \cdot \tan\phi = La \cdot \phi \tag{5}$$

Then, substituting into equation (2)

$$Lb = [(La)^2 \cdot \Phi^2 + (La)^2]^{0.5} - La$$
$$= La \cdot (1+\Phi^2)^{0.5} - La$$
$$= \Phi, \text{ for small values of } \Phi$$

This means that Lb in equation (3) is also proportional to $\phi$ Therefore, from equation (4):

$$F(T) \text{ is proportional to } K \cdot \phi^2 \tag{6}$$

This result also means that a resulting angular displacement of the hub/shaft, 24, will be proportional to the square root of an applied torque. Since the applied torque from an impeller is proportional to flow squared, then the angular displacement of the hub/shaft will be proportional to flow. This is the desired result since the torque sensor would see a linear relationship to flow. This result, however, is only a very simplified approximation of the beam forces which occur.

There are two other factors which enter into the torque response. These are the linear force required to bend the beam, 20, of FIG. 5A and also the linear torque required to drive the torque sensor. Both of these will mask the square root response of the linearizer when the torque is very small but then the square root relationship will become the predominant response for larger values of torque. The relationship between all of these is determined by selecting the beam and hub dimensions along with the diameter of the coupling shaft, 7, of FIG. 1. Assuming a torque sensor, 14, which will respond with very small angular displacements, then the angular displacement required of the linearizer, 2, will essentially be determined by the torsional flexure of the coupling shaft, 7a.

Figure 6:
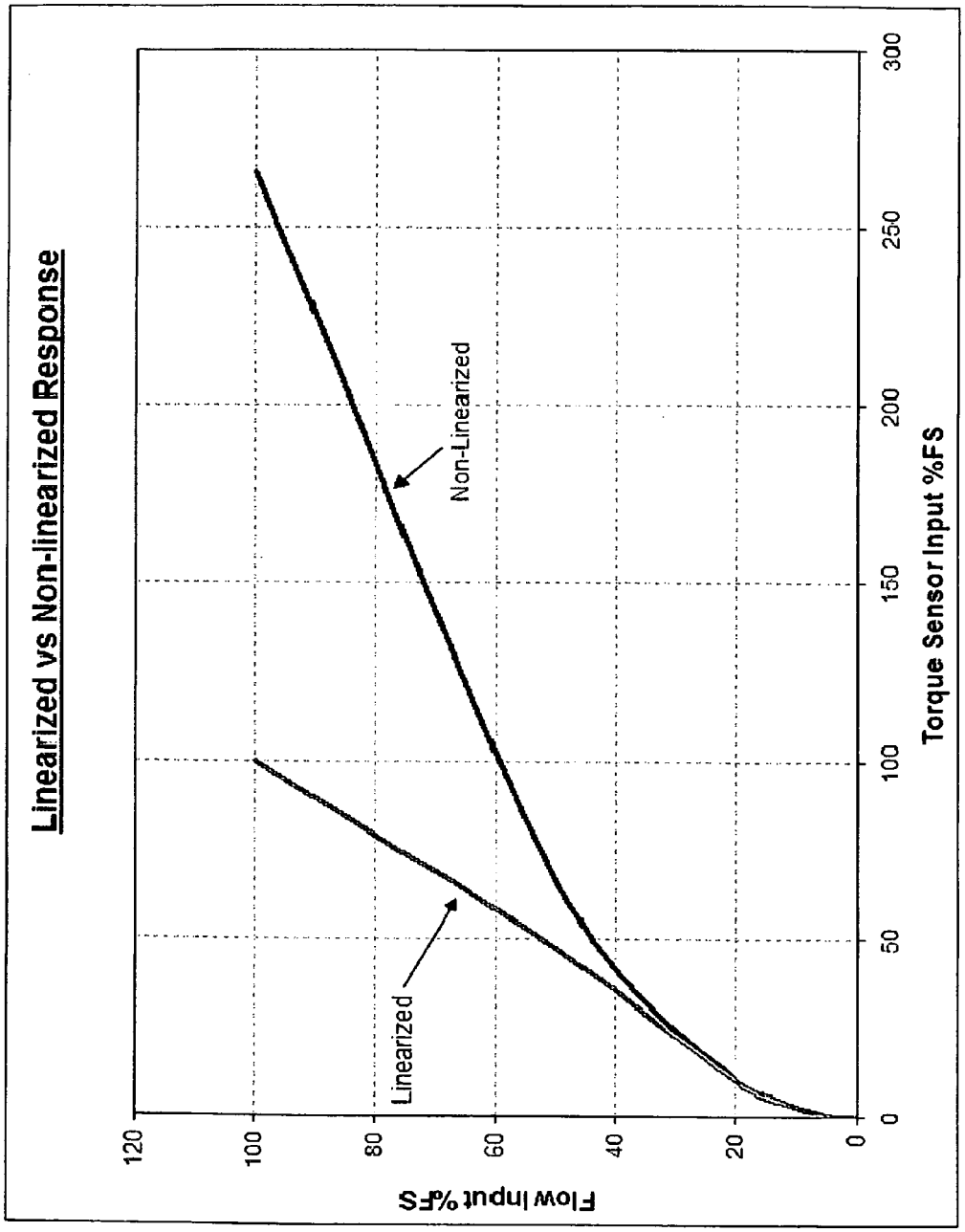
FIG. 6 graphs the flow response for a linearized and non-linearized torque sensor input.

FIG. 6 shows an example of the final total response of the linearizer, plus torque sensor, to flow. This appears a more linear response compared to the uncorrected flow response. Of course, this response is the result of compromises and can be modified by changing the dimensional parameter selection As afore mentioned, traditional spinners are linear with fluid velocity so they are capable of measurement over a wide flow range. Downhole conditions, however, are generally not conducive to reliable operation of delicate, low friction bearings at very low flows. Also, sustained high flow rates can quickly wear out these precision bearings so overall poor reliability can result under downhole well conditions.

A big advantage of the present invention is that volumetric fluid flow rate or fluid flow velocity is measured without any moving parts and these problems are, therefore, circumvented. The corresponding tradeoff, however, is a more limited measurement range so it is desirable to have a way to easily change the range in the field. This can be accomplished by designing the basic flow sensor for maximum sensitivity and then reducing this sensitivity, as required, by the method of a second embodiment.

One aspect of this invention is that wells are encountered which cover a wide range of flow rates. Changing the impellers can provide this but it would be desirable for this flowmeter to easily have its range of velocity or volumetric flow rate changed in the field.

A second embodiment of this invention therefore, is to incorporate an easily field-interchangeable flow restrictor 4 within it. If the flow meter is sensitive enough to cover the required low flow conditions then the higher flow ranges can be configured by simply changing the size of this restrictor. The restrictor is shown in FIG. 1 as item, 4. The restrictor 4 is simply a round sleeve configured to change the diameter of a central, axially positioned, shaft. 15, so that the annular open flow area between the restrictor 4 and the outer housing, 8, changes as a function of the desired flow range.

Again, referring to FIG. 1, the diameter of the fixed shaft, 15, may be the same as the diameter of the linearizer, 2, for maximum flow sensitivity. The impeller, 3, is also constructed with its static vanes 17 arced about a central shaft, 16, of the same diameter as the linearizer, 2. All of the flow, then, will have to pass across the vanes 17 of the impeller 3 since it is effectively blocked from passing within the central area of the three center shafts. This is desirable because the maximum area, and moment arm, of the impeller 3 exists at the periphery of the vanes 17 and decreases substantially as flow approaches the axial center. In fact, the pitch angle of the impeller vanes 17 will give the flow a rotational swirl which, in itself, will tend to focus the flow away from the axial center.

At this point, it is important to remember that this flow meter assembly is actually inserted into a flow line to measure the flow within that line. The outer diameter of the flow meter impeller housing may, for example, be on the order of 1.7 inches whereas the inner diameter of the flow line will normally be greater than about 2.9 inches for example. This means that a significant portion of the flow will actually flow around the flow meter assembly. The pressure drop across the impeller assembly, then, becomes instrumental in determining the portion of the total flow to actually pass through the flow meter.

It should be evident that putting a sleeve, 4, on shaft, 15, will have the effect of increasing the pressure drop across the impeller assembly because the flow area between the impeller housing, 8, and the added sleeve, 4, is now smaller than before. This, then, will reduce the relative flow through the flow meter so that it is effectively measuring at a higher range. Naturally, this technique will have little effect as the flow line inner diameter approaches the outer diameter of the impeller housing. Under these conditions, all of the flow will begin to pass through the flow meter, essentially independent of the pressure drop across the impeller assembly. Fortunately, however, large flows are generally measured in relatively large flow lines.

It will be apparent to those skilled in the art that various changes may be made in the invention without departing from the spirit and scope thereof and therefore the invention is not limited by that which is disclosed in the drawings and specifications but only as indicated in the appended claims.

Though the invention disclosed herein has been described in terms of specified and presently preferred embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A fluid flow meter comprising:
   a housing;
   a torque force measuring means disposed in said housing;
   a first torque shaft increment disposed along a torque axis and coupled at one end thereof to said force measuring means for measuring torque forces in said torque shaft about said torque axis;
   a static impeller secured proximate of one end of a second torque shaft increment that is disposed along said torque axis for developing torque forces about said torque axis in response to fluid flow contacting said flow impeller; and,
   linearizer means disposed along said torque axis between said one end of said first shaft increment and said one end of said second shaft increment, respective other ends of said first and second shaft increments being secured to said linearizer means, said linearizer means for converting exponential angular displacement of said impeller due to fluid flow thereover to a more linear angular displacement at the one end of said first shaft increment essentially corresponding to the rate of fluid flowing over said static impeller.

2. A fluid flow meter as described by claim 1 wherein said linearizer means comprises a resilient coupling between said shaft and said housing.

3. A fluid flow meter as described by claim 1 wherein said linearizer means comprises an outer frame secured to said housing and an inner hub secured to said first and second shaft increments, said outer frame and inner hub linked by exponentially resilient beam elements.

4. A fluid flow meter as described by claim 1 wherein said first and second shaft increments are respective segments of a materially integral shaft.

5. A fluid flow meter as described by claim 1 wherein said first and second shaft increments are materially distinct elements.

6. A fluid flow meter as described by claim 1 further comprising flow restrictor means for prescribing a preferred range of flow rate contacting said impeller.

7. A flow meter system for use in a flowing stream of fluid, said system including:
   a flow meter having a housing;

a static shaft axis within said housing linking torque force measuring means and static impeller means:

said torque force measuring means disposed in said housing for converting torque values in said static shaft to fluid flow values;

said static impeller means disposed in said housing to impose torsional stress upon said shaft axis as an exponential function of a fluid flow over said impeller means; and, linearizer means disposed along said shaft axis between said impeller means and said measuring means for converting said exponential torque function to a substantially linear torque function of fluid flow rate.

8. A flow meter system as described by claim 7 wherein said linearizer means comprises a resilient coupling between said shaft axis and said housing.

9. A flow meter system as described by claim 7 wherein said linearizer means comprises an outer frame secured to said housing and an inner hub secured to said shaft axis, said outer frame and inner hub linked by exponentially resilient beam elements.

10. A flow meter system as described by claim 7 wherein said shaft axis is continuous along a materially integral shaft.

11. A flow meter system as described by claim 7 wherein a portion of said shaft axis between said measuring means and said linearizer means is materially distinct from said shaft axis between said impeller and said linearizer means.

12. A flow meter system as described by claim 7 further comprising flow restrictor means for prescribing a preferred range of flow rate contacting said impeller.

13. A method of measuring fluid flow in a flowing stream of fluid including the steps of:

providing a well tool having static impeller means proximate of one end of a first section of a static shaft axis and a torque force measuring means proximate of one end of a second section of said shaft axis;

providing resilient linearizer means along said shaft axis between said first and second shaft sections;

lowering said well tool into a wellbore for measurement of fluid flow within said well bore;

channeling at least a portion of said fluid flow over said impeller means to torsionally stress said first section of said shaft axis as an exponential function of said fluid flow;

converting said exponential function of said fluid flow to a linear function of said fluid flow by said linearizer means; and, translating said linear function to a fluid flow parameter by said torque force measuring means.

14. A method of measuring flow as described by claim 13 wherein said portion of said fluid flow over said impeller is coordinated to a predetermined range of fluid flow translated by said measuring means.

15. A method for determining the total flow rate of a flowing stream of fluid in a well bore comprising the steps of:

lowering a well tool into a well bore to a location for a measurement of fluid flow, said well tool having torque force measuring means disposed proximate of one end of a non-rotating torque shaft axis, static impeller means disposed proximate of an opposite end of said axis and linearizer means disposed along said shaft axis between said impeller means and said measuring means for converting torque induced angular displacement of said shaft by fluid flow over said impeller means that is an exponential function of said fluid flow to a linear function of said flow;

channeling well fluid flow over said impeller means to torsionally stress said shaft into said linearizer; and, measuring a flow rate of said fluid by measuring means conversion of shaft torque stress from said linearizer.

16. A method of determining the total flow rate of a flowing stream as described by claim 15 wherein a predetermined area for admitting fluid flow over said impeller means is coordinated to a predetermined fluid flow rate range to be measured by said measuring means.

* * * * *